United States Patent [19]

Walters

[11] Patent Number: 5,157,592

[45] Date of Patent: Oct. 20, 1992

[54] DC-DC CONVERTER WITH ADAPTIVE ZERO-VOLTAGE SWITCHING

[75] Inventor: Michael M. Walters, Endwell, N.Y.

[73] Assignee: International Business Machines Corporation, Armonk, N.Y.

[21] Appl. No.: 776,946

[22] Filed: Oct. 15, 1991

[51] Int. Cl.[5] .......................................... H02M 3/335
[52] U.S. Cl. ...................................... 363/17; 363/98; 363/132
[58] Field of Search ............. 363/17, 56, 98, 132-133, 363/134, 58, 136

[56] References Cited

U.S. PATENT DOCUMENTS

| 2,516,563 | 7/1950 | Graves | 321/43 |
|---|---|---|---|
| 2,683,853 | 7/1954 | Logan | 321/25 |
| 2,683,854 | 7/1954 | Conrath | 321/25 |
| 2,778,987 | 1/1957 | Schmidt, Jr. | 323/89 |
| 2,843,818 | 7/1958 | Mintz et al. | 321/16 |
| 2,931,971 | 4/1960 | May | 323/89 |
| 3,048,767 | 8/1962 | Smeltzer | 321/25 |
| 3,076,131 | 1/1963 | Weil | 321/25 |
| 3,344,359 | 9/1967 | Bingham | 330/8 |
| 3,422,341 | 1/1969 | Kurimura et al. | 321/18 |
| 4,217,632 | 8/1980 | Bardos et al. | 363/26 |
| 4,253,138 | 2/1981 | Shelly | 363/56 |
| 4,356,438 | 10/1982 | Iwasaki | 318/344 |
| 4,451,876 | 5/1984 | Ogata | 363/21 |
| 4,460,955 | 7/1984 | Hattori et al. | 363/91 |
| 4,811,184 | 3/1989 | Koninsky | 363/17 |
| 4,811,187 | 3/1989 | Nakajima | 363/25 |
| 4,931,920 | 6/1990 | Barker | 363/82 |
| 4,953,068 | 8/1990 | Henze | 363/17 |

OTHER PUBLICATIONS

"Design Considerations for High-Voltage High-Power Full-Bridge Zero-Voltage-Switched PWM Converter", IEEE Sabate et al., pp. 275-284.

"Saturable Reactor Assisted Soft-Switching Full--Bridge DC-DC Power Convertors", S. Hamada et al,. IEE Proc.-B, vol. 138, No. 2, Mar. 1991, pp. 95-103.

"A High-Density Modular Power Processor For Distributed Military Power Systems", M. M. Walters et al., IEEE, Mar. 1989, pp. 403-413.

Primary Examiner—Steven L. Stephan
Assistant Examiner—Adolf Berhane
Attorney, Agent, or Firm—William H. Steinberg

[57] ABSTRACT

A circulating current control for a phase shifted full bridge inverter is provided to control the powder dissipation and efficiency of the converter responsive to changing operating conditions. The minimum circulating current necessary for zero-voltage switching is regulated by adjusting the reset current of saturable reactors. Therefore, zero-voltage switching can be achieved with a minimum of condition losses. The converters efficiency is optimized over a wide range of operating conditions.

17 Claims, 4 Drawing Sheets

DC-DC CONVERTER WITH ADAPTIVE ZERO-VOLTAGE SWITCHING

BACKGROUND OF THE INVENTION

The present invention relates to switching power converters with zero-voltage switching of the power transistors of a resonant-transition power converter.

The power converter portion of modern electronic equipment tends to be bulky and is often the limiting factor when attempting to miniaturize. In reducing power converter size, designers have turned to increased switching frequencies. Higher frequencies allow for smaller, lighter inductive and capacitive energy storage devices, but also bring with them increased switching power losses.

The power dissipation of DC-DC power converters can be reduced by using zero-voltage switching techniques. Zero-voltage switching occurs when a power device begins conduction with a near zero-voltage across the device. Achieving zero-voltage switching over a large range of line voltages and loads is desirable to reduce electromagnetic interference. Previous approaches to achieve zero-voltage switching over large line voltage and load variations has increased the conduction losses of the power devices by increasing the currents carried by the switching devices after they were turned on, resulting in little or no overall gain in efficiency.

A practical example of zero-voltage switching occurs in the power devices of a phase-shifted full bridge converter under certain operating conditions. In the phase-shifted full bridge converter, shown in FIG. 1, MOSFET switches Q1, Q2, Q3, and Q4 operate at a fixed frequency, and the on time of diagonally conducting power devices is not varied as in pwm bridge, but rather the power devices in each leg (one inverter leg having Q1 and Q2, the other leg having Q3 and Q4) are made to alternately conduct at a duty cycle approaching 50%, as can be seen in the waveform diagrams shown in FIG. 2. The phase shift between the operation of the devices of each of the legs determines when diagonal switches are conducting at the same time and therefore suppling power to a load. By varying the phase shift, the resulting output voltage can be pulse width modulated. In the converter of FIG. 1, the transformer primary current current flowing at turn-off of one transistor charges the parasitic capacitances of that transistor while reducing the charge on the parasitic capacitances of the other transistor in the same leg, thereby reducing the voltage across the other transistor, which is also the next transistor to be turned on. As a condition of zero-voltage switching, the turn-on of the transistor in the same leg with the transistor that was just turned off, must be delayed until the voltage across the transistor has been reduced to near zero. For a pair of transistors in the same leg, the time required to charge the capacitances of the transistor being turned off and discharge the parasitic capacitances of the transistor to be turned on, is inversely proportional to the square of the magnitude of current established before the switching interval.

Assuming negligible magnetizing current, the transformer primary current established before the switching interval is different for the two inverter legs in the phase shifted, full bridge inverter. This occurs since Q3 and Q4 are turned on after diagonally conducting transistors (either Q2 and Q3, or Q1 and Q4) where delivering power to the load, and the transformer primary current established before the switching interval is the reflected output inductor current. Transistors Q1 and Q2 are turned on after a freewheeling period when current was being circulated in the bridge, and the current established before switching is the current circulating in the transformer primary during the freewheeling interval. The freewheeling interval is the portion of each cycle when no energy is being supplied to the output from the input power source. The transformer leakage inductance is the energy source displacing charge on the parasitic capacitances of transistors Q1 and Q2, where the magnitude of energy is proportional to the square of the circulating current. The circulating current will decay during the freewheeling interval, as a result of both output rectifiers, which are connected to the two ends of the transformer secondary, conducting current and reducing the energy stored in the leakage inductance. The circulating current is equal to the difference in output rectifier currents divided by the turns ratio of the transformer. With both output rectifiers carrying equal current, the transformer primary current would be zero, resulting in no energy available in the transformer leakage inductance to charge the parasitic capacitances of the transistor to be turned on, and for this condition, zero-voltage switching is not achieved. The magnitude of the circulating current is always less than the reflected output inductor current when power is being delivered to the load. Therefore, zero-voltage switching is more difficult to achieve with transistors Q1 and Q2, which are turned on after circulating current was flowing in the bridge.

One approach to maintain zero-voltage switching is to increase the magnitude of the leakage inductance. This will reduce the magnitude of the current decay during the freewheeling interval. Additional leakage inductance will also increase the energy available for displacing charge on the transistor's output capacitances. With this approach, a minimum leakage inductance can be specified to meet zero-voltage switching requirements for a specific line and load condition. However, the high leakage inductance will reduce the effective duty cycle ratio of the transformer secondary due to the increased recovery time of the output diodes. This will limit the input voltage range of the converter and adversely affect the voltage control characteristics.

Another approach for achieving zero-voltage switching over a wide input line and output load range uses saturable reactors with specific blocking characteristics. A saturable reactor is used in series with each push-pull output rectifier. This technique uses a round or flat B-H loop reactor core material to induce a significant flux excursion during the output rectifier commutating interval. The reactor will provide a blocking characteristic proportional to the flux excursion. The blocking characteristic of the reactor together with a clamped primary prevents the conduction of both rectifiers during the freewheeling interval. This forces the circulating inductor to follow the output inductor current. Therefore, more energy is available to displace the transistor's parasitic capacitance charge. However, for a converter to achieve zero-voltage switching at a light load, the saturable core must be designed to block the entire freewheeling interval. At full load, more than the required energy for zero-voltage switching is available, and as a consequence, transistor conduction losses are increased.

It is an object of the present invention to provide zero-voltage switching with reduced conduction losses in resonant-transition DC-DC converters.

It is another object of the present invention to provide zero-voltage switching with reduced conduction losses in a resonant-transition DC-DC converter over both large line voltage changes and load changes.

It is yet another object of the present invention to provide zero-voltage switching with reduced conduction losses in a resonant-transition DC-DC converter over large line voltage changes and load changes without reducing the input voltage range or adversely affecting the voltage control characteristics of the converter.

SUMMARY OF THE INVENTION

In one aspect of the present invention, a resonant transition, DC-to-DC, switching power converter circuit, is provided, including a bridge circuit having a first and second switch connected in series to form a first leg, and a third and fourth switch connected in series to form a second leg. The first and second legs are connected in parallel with one another and in parallel with a DC power supply means. A power transformer having a primary and a secondary winding, has one end of the primary winding connected to the junction of the first and second switch, and the other end of the primary winding connected between the junction of the third and fourth switch. Means for determining and controlling a conduction interval for each of the switches is provided to produce alternating periods of power transfer and freewheeling. A first and second saturable reactor, each having a high impedance state and a saturated state, are connected to the secondary winding. Rectifier means are connected to the saturable reactors to provide a rectified output. Means for determining the circulating current at the end of the freewheeling period is provided as well as means for introducing a reset current through the saturable reactors, responsive to the circulating current, for maintaining sufficient circulating current at the end of the freewheeling period to achieve zero voltage switching after the freewheeling period.

In another aspect of the present invention, a method of achieving zero-voltage switching with reduced conduction losses in a DC-DC converter which clamps a transformer primary during the freewheeling period, and has saturable reactors in series with the secondary winding of a transformer and in series with output rectifiers is provided. The circulating current flowing in the transformer primary at the end of the freewheeling period is determined. A reset current responsive to the circulating current is provided to adjust the blocking interval of saturable reactors during the freewheeling interval, to adjust the circulating current to the minimum value needed to achieve zero-voltage switching.

DETAILED DESCRIPTION OF THE INVENTION

Figure 3:
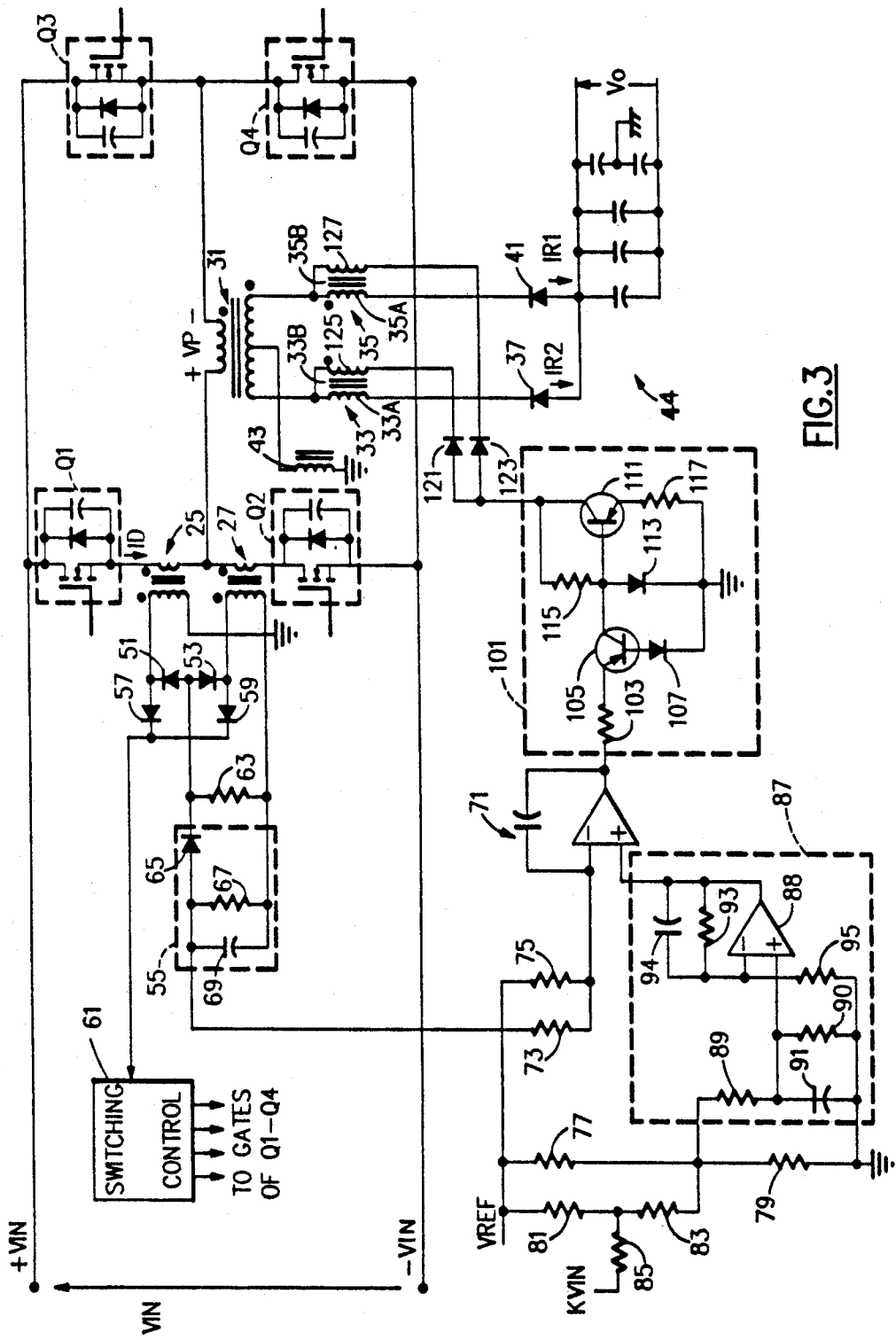
FIG. 3 is a schematic circuit representation of a phase shifted full bridge converter in accordance with the present invention.

Referring now to the the drawing and particularly FIG. 3 thereof, a quasi-square wave inverter that clamps the primary of an output transformer during the freewheeling interval is shown as a full bridge, resonant transition, DC-DC switching power converter. The converter comprises a full bridge switching circuit having four switching devices shown as n-channel power MOSFETs Q1, Q2, Q3, and Q4. The power MOSFETs each have an intrinsic body diode connected from source to drain, with the anode of the body diode connected to the source of the MOSFET and a parasitic junction capacitance connected from source to drain of the MOSFET. A first leg of the converter has MOSFET Q1 connected in series with the primaries of two current transformers 25 and 27 and with MOSFET Q2, all of which are connected between positive and negative DC voltage rails +VIN and −VIN, respectively. A second leg of the converter has MOSFETs Q3 and Q4 connected in series with one another between rails +VIN and −VIN. The drains of MOSFETs Q1 and Q3 are connected to the positive rail and the sources of MOSFETs Q2 and Q4 are connected to the negative rail. The dotted end of the primary winding of current transformer 25 is connected to the source of MOSFET Q1. The dotted of the primary winding of current transformer 27 is connected to one end of the primary winding of transformer 25. The dot convention is used to signify that when the dotted end of the primary has a positive voltage, a positive voltage will be induced at the dotted end of the secondary.

Figure 1:
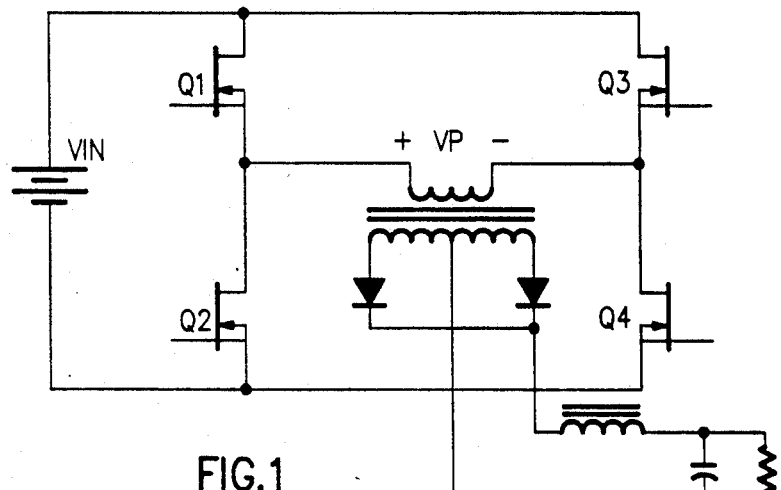
FIG. 1 is a schematic diagram of a prior art phase-shifted full bridge converter.
Figure 2:
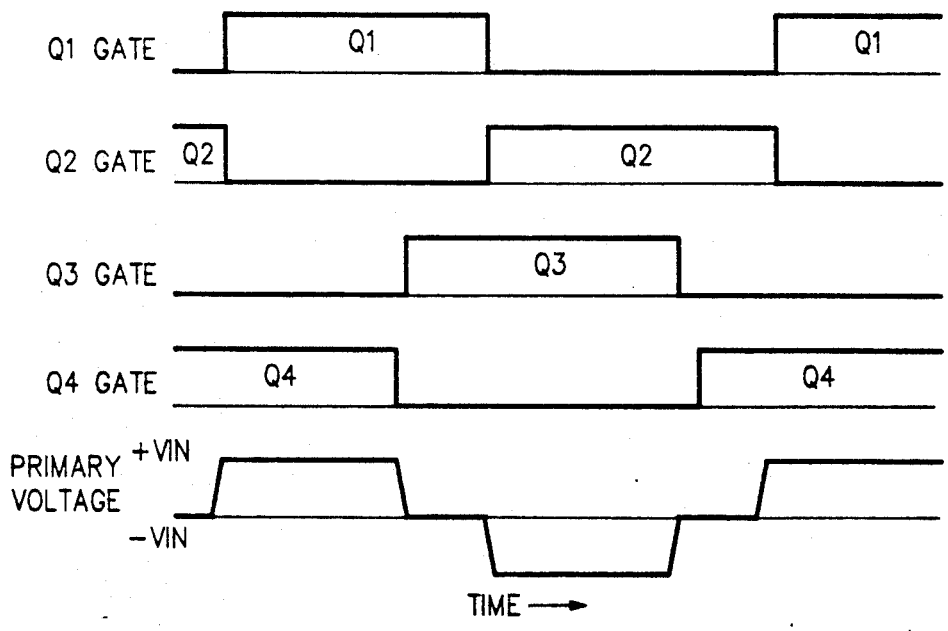
FIGS. 2A-2E are waveform diagrams on a common time scale, showing the gate voltages for the four transistors in the full bridge and the resulting primary voltage, respectively, from the operation of the converter of FIG. 1.

One end of the primary winding of a transformer 31 having a center tapped secondary, is connected between primary windings of transformers 25 and 27. The other end of the primary winding of transformer 31 is connected between MOSFETs Q3 and Q4. The first and second ends of the center tapped secondary of transformer 31 is connected in series with saturable reactors 33 and 35, each of which includes a reactor winding 33A and 35A and a saturable core 33B and 35B, respectively. The core material of each of the saturable reactors preferably has a square B-H characteristic. Each of the saturable reactors 33 and 35 are connected in series with a respective diode 37 and 41. Diodes 37 and 41 have their cathodes joined to one another. The center tap of the secondary winding of transformer 31 is connected through an output inductor 43 to ground. The output of the converter Vo is available across a network of parallel capacitors 43 connected between the cathodes of diodes 37 and 41, and ground. Alternatively, the center tap of the secondary winding of transformer 31 can be grounded and the output inductor can be connected between the cathodes of diodes 37 and 41, and the capacitor network 43, as shown in FIG. 1.

One end of each of the secondary windings of the current transformers 25 and 27 is connected to ground. The dotted ends of the secondaries are coupled to the cathodes of respective diodes 51 and 53, and through these diodes to a peak detecting circuit 55. The dotted ends of each of the secondary windings of each of the current transformers 25 and 27 is also connected to the anodes of respective diodes 57 and 59, to provide a signal to a power transistor switching control 61. A resistor 63 is connected across the inputs of the peak detector circuit 55 for developing a voltage from the diode 51 and 53 outputs. The peak detector circuit comprises a series connected diode 65 having its cathode connected to the anode of diodes 51 and 53. The anode of diode 65 is connected to one end of parallel connected resistor 67 and capacitor 69. The other end of the parallel connected resistor 67 and capacitor 69 is connected to ground. The output of the peak detector circuitry is available across the parallel resistor 67 and capacitor 69 and is connected to the inverting input of an error amplifier 71, through a resistor 73. A voltage reference signal VREF is also connected to the inverting input of error amplifier 71 through a resistor 75. The reference voltage is connected through a voltage divider, comprising resistors 77 and 79, to ground and the reference voltage is further connected through two resistors 81 and 83 to the junction of resistors 77 and 79. A second reference voltage KVIN proportional to the input voltage, but which is preferably obtained from the secondary side of transformer 31, is connected through a resistor 85 to the junction of resistors 81 and 83.

The junction of resistors 77 and 79 is connected through a buffer 87 to the noninverting input of error amplifier 97. Buffer 87 comprises an operational amplifier 88 having its noninverting input connected through resistor 89 to the junction of resistors 77 and 79. The noninverting input is also connected to ground through parallel connected resistor 90 and capacitor 91. A parallel connected resistor 93 and capacitor 94 are connected between the inverting input and the output of the operational amplifier 88. The inverting input terminal of the operational amplifier is connected to ground through resistor 95. The output of the error amplifier is connected to a voltage controlled clamp 101. The clamp comprises a resistor 103 connected to the emitter of a pnp transistor 105. The base of transistor 105 is connected to ground through a diode 107, with the cathode of diode 107 connected to ground. The collector of transistor 105 is connected to the base of transistor 111 and through a zener diode 113 to ground, with the cathode of the zener 113 connected to ground. A resistor 115 is connected between the base and collector of transistor 111. The emitter of transistor 111 is connected through resistor 117 to ground. The collector of transistor 111 is connected to the anodes of diodes 121 and 123, which are connected to control windings 125 and 127, associated with saturable reactors 33 and 35, respectively. The control windings 125 and 127 are connected between the secondary winding of transformer 31 and their respective saturable reactors 33 and 35.

Converter Operation

In operation, the MOSFET switches Q1-Q4 operate at a fixed frequency, and the on-time of diagonally conducting power devices is not varied as in pwm bridge, but rather the power devices in each leg are alternately conducting at a duty cycle approaching 50%. The phase shift between the operation of the devices of each of the legs determines when diagonal switches are conducting at the same time and therefore suppling power to a load. By varying the phase shift, the resulting output voltage can be pulse width modulated. The switching waveforms are shown in FIGS. 4D-4G. In the converter of FIG. 3, the current flowing at turn-off of one transistor charges the parasitic capacitances of that transistor, while reducing the charge on the parasitic capacitances of the other transistor in the same leg, thereby reducing the voltage across that transistor, which is also the next transistor to be turned on. As a condition of zero-voltage switching, the turn-on of the transistor in the same leg with the transistor that was just turned off must be delayed until the voltage across the transistor has been reduced to near zero. For a pair of transistors in the same leg, the time required to charge the capacitances of the transistor being turned off and discharge the parasitic capacitance of the transistor to be turned on is proportional to the square of the magnitude of current established before the switching interval.

The current established before the switching interval is different for the two inverter legs in the phase shifted, full bridge inverter. This occurs since transistors Q3 and Q4 are turned on after diagonally conducting transistors Q1 and Q4, or Q3 and Q2 were delivering power to the load, where the transformer primary current established before the switching interval is the reflected output inductor current. Transistors Q1 and Q2 are turned on after a freewheeling period when the transformer primary current established before switching is the circulating current. The magnitude of the circulating current is always less than the reflected output inductor current. Therefore, zero-voltage switching is more difficult to achieve with transistors Q1 and Q2 which are turned on after circulating current was flowing in the bridge of the converter. Achieving zero-voltage switching of transistors Q1 and Q2 which are turned on after the freewheeling period is an object of the present invention.

In operation, the zero-voltage switching is achieved with reduced conduction losses in the resonant-transition DC-DC converters by adjusting the circulating current flowing during the freewheeling interval in the transformer primary, to the minimum necessary to achieve zero-voltage switching. Zero-voltage switching is achieved if the delay time between the turn-off of one device and the turn-on of the next device is approximately one quarter of the resonant period determined by the parasitic capacitances and transformer leakage inductance and the energy stored in the transformer leakage inductance is greater than the energy required to displace charge on the parasitic capacitances of the transistors in the inverter leg to be switched.

A reset control current which flows through the control windings 125 and 127 is used to adjust the blocking characteristic (volt-time product) of the saturable reactors 33 and 35. The blocking property of the saturable reactors will prevent current flow in one of the output rectifiers 37 or 41, during a portion of the freewheeling interval, forcing unequal current distribution in the secondary windings. The freewheeling period is indicated by numeral 129 in FIG. 4C. The circulating current is the difference between the output rectifier currents through diodes 37 and 41 divided by the turns ratio of transformer 31. Therefore, the circulating current can be adjusted by changing the reset control current.

Assume MOSFETs Q2 and Q4 are conducting, which means current is being circulated during a freewheeling period. Saturable reactor 33 provides blocking, substantially limiting current flow through saturable inductor 33, until it saturates. The term "blocking" as used herein, refers to the non-saturated, high impedance state of a saturable reactor. The amount of blocking (measured in volt-seconds) provided by each saturable reactor is a function of how far the saturable reactor is from saturation at the beginning of the blocking interval. The process of bringing the saturable out of saturation and into its high impedance mode is known as "reset".

As can be seen in FIGS. 4D-4G, MOSFET Q2 is turned off next. The parasitic capacitances of Q1 and Q2 together with the transformers leakage inductance form a resonant circuit during the switching interval. Current from the primary winding of transformer 31 flows into the uncharged parasitic capacitances across MOSFET Q2, and negative current flows into the charged parasitic capacitances of MOSFET Q1 reducing its charge. The current flowing through Q1, including the parasitic capacitances, is shown in FIG. 4A. The negative portion of this current flows through the primary of current transformer 25, causing a current to flow through the secondary of current transformer 25, diode 51, and resistor 63 creating a voltage across resistor 63 which is supplied to the peak detector 55. The voltage waveform, Vx, supplied to the peak detector is shown in FIG. 4B. The magnitude of the current flowing from the parasitic capacitances across MOSFET Q1 depends on the value of circulating current just before MOSFET Q2 turns off, with the detected peak magnitude being proportional to the circulating current. The current that flows after Q2 turns off, increases the charge on the parasitic capacitance of Q2 and reduces the charge across Q1. If sufficient circulating current is available, the voltage across Q2 will resonate up, forward biasing the internal body diode of Q1 and when Q1 turns on, there will be close to zero voltage across Q1. If insufficient circulating current was flowing just before Q2 turned off, then close to zero voltage turn-on of Q1 will not be achieved, since the parasitic capacitance across Q1 will not be sufficiently discharged.

A voltage inversely proportional to the circulating current is held in peak detector 55. The value held is allowed to decay based on the time constant of resistor 67 and capacitor 69, so only the most recent peak value is available. The peak value is scaled by resistor 73 and added with the reference voltage scaled by resistor 73 at summation node and inverting terminal of the error amplifier 71. A voltage KVIN, which is reduced for increasing values of input voltage, is connected to the noninverting input of the error amplifier 71. The output of the error amplifier 71 increases, with increasing magnitude of current flowing to discharge the parasitic capacitances of the MOSFET to undergo switching. The voltage controlled clamp 101 provides lower negative values with increasing magnitude of current flowing to discharge the parasitic capacitances of the MOSFET to undergo switching.

The negative voltage provided by the voltage clamp is connected to two steering diodes 121 and 123, respectively. After Q2 turns off, Q1 turns on. With Q1 and Q4 conducting, power is provided to the load with diode 37 conducting and the voltage on the cathode of steering diode 123 more negative than the negative voltage from the voltage controlled clamp 101, causing a reset current to flow in the control winding 127. This will reset saturable reactor 35B. The magnitude of the reset current is determined by the clamp voltage, with a lower negative voltage (larger voltage) resulting in greater reset current flowing than will occur when the clamp voltage provides higher negative voltages. Therefore, the smaller the magnitude of the current flowing to remove charge from the MOSFET to undergo switching, the greater the peak voltage (a less negative voltage) detected, and the greater the reset current.

Figure 4:
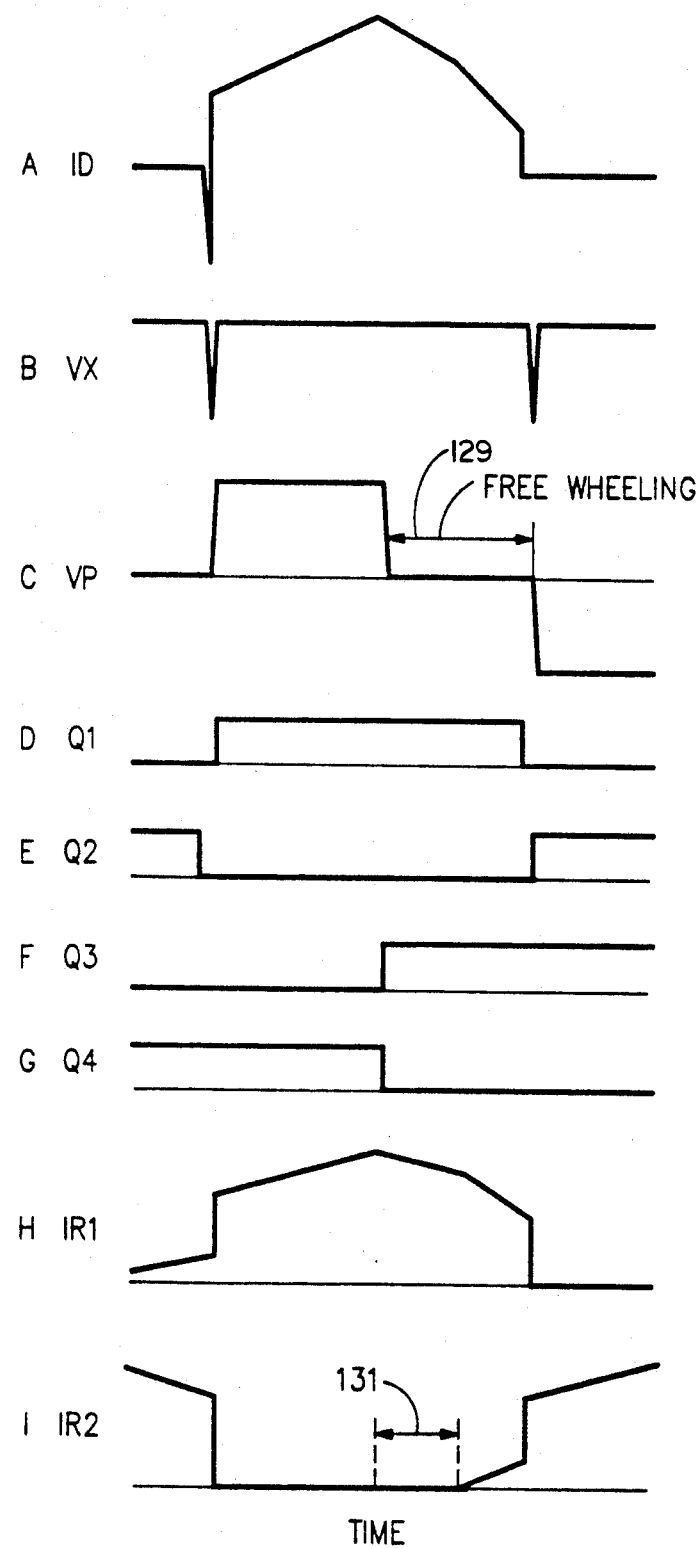
FIGS. 4A-4I are waveform diagrams on a common time scale showing the current flowing in MOSFET Q1, the voltage provided to a peak detector, transformer primary voltage, gate voltage for MOSFETs Q1-Q4, and the current through the two output rectifiers, respectively, from the operation of the circuit shown in FIG. 3.

Transistor Q4 turns off next, with the reflected load inductor current providing the current needed to transfer charge to Q4 and to discharge the parasitic capacitances associated with transistor Q3. Diode 41 does not conduct current when Q4 turns off, since saturable reactor 35, which was reset, blocks conduction. It will be noted that the current transformers 25 and 27 do not provide any signals to the peak detector 55, when transistors Q3 and Q4 are switched. When transistor Q4 is turned off, saturable reactor 35 blocks at least a portion of the freewheeling period based on the amount of reset current it received. As can be seen in FIGS. 4H and 4I, the circulating current just before switching is controlled to a desired value by controlling the blocking interval of the saturable reactors, shown as reference numeral 131 in FIG. 4I, to achieve unbalanced current flow in different halves of the transformer secondaries during the freewheeling interval. The voltage stored in the peak detector 55, is used for adjusting the error amplifier which controls the reset of the saturable reactors. The error amplifier 71, which acts as an integrator, introduces a delay in the feedback circuit providing the reset current in response to changing conditions with a number of cycles necessary to achieve equilibrium after a change in conditions such as supply voltage and/or load occurs.

Referring again to FIGS. 4H and 4I, the relationship between the the amount of reset current on the blocking interval and the resulting circulating current is shown. The blocking interval is adjustable and can be any portion or all of the freewheeling interval. During the blocking interval, the circulating current slope and magnitude is the reflected output inductor current. After the blocking interval, the reactor saturates and the circulating current slope will change. The difference in the output rectifiers' forward voltages will be reflected to the primary and will appear across the leakage inductance. The circulating current slope after the blocking interval is the reflected differential rectifier voltage divided by the leakage inductance. The magnitude of the circulating established before the switching interval can be varied by adjusting the blocking interval. For a given line and load condition, an increase in the magnitude of the reset current will cause a higher saturable reactor flux excursion, increase the blocking interval and increase the circulating interval established in the transistors before the switching interval. The result is an increase in the energy available for displacing the charge on the parasitic transistor capacitances.

An additional function provided by the saturable reactor is the control of the output rectifier reverse voltage. Both the rate of change of reverse voltage and the peak voltage overshoot can be controlled. The reversal of current through the rectifier will reset the saturable reactor. The reactors impedance will increase dramatically during the commutating interval as the reactor is driven out of saturation. The increasing impedance will control the rate of rise rectifier reverse voltage and will limit the peak voltage overshoot. The reverse voltage performance and the magnitude of the reset flux excursion is determined by the saturable reactor core material and geometry.

The circulating current can be controlled within constraints determined by the converter and saturable reactor. Square B-H loop reactor core material is desirable in this technique for a large control range. The lower limit of circulating current with no blocking interval (reset current zero) is equal to the naturally decayed current found in prior art converters. However, a minimum core reset, induced by the reverse rectifier commutating current, will result in a minimum blocking interval. A reactor core material with a high squareness ratio (Bs/Hc) will minimize the flux excursion and therefore the blocking interval caused by the rectifier blocking current. The upper limit of the circulating current, with the blocking interval equal to the entire freewheeling interval, is the reflected output inductor current plus the transformer magnetizing current. The magnetizing current can optionally be increased, by decreasing the transformers magnetizing inductance, for an increased load range of zero-voltage switching, For maximum control range, the reactor must have sufficient saturation flux density (Bs) and core area (Ac) to block the entire freewheeling interval.

Figure 5:
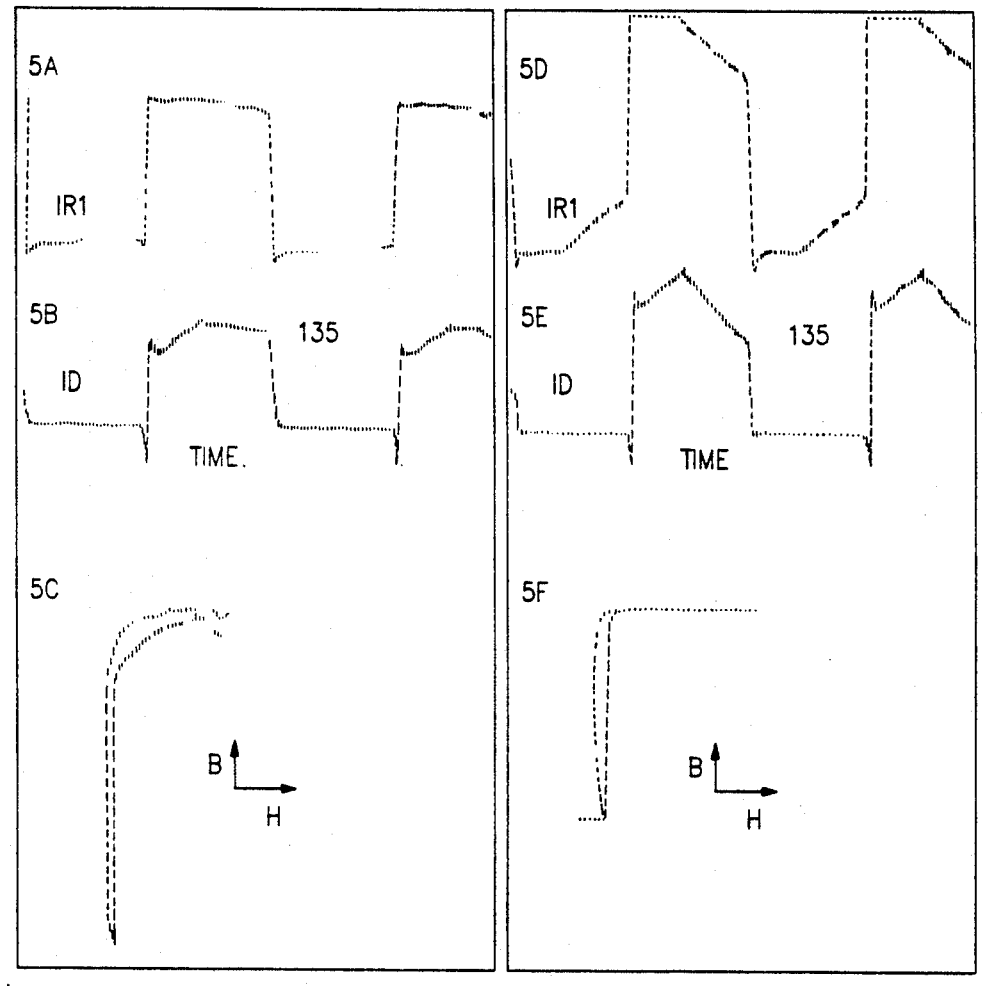
FIGS. 5A-5F are waveform and hysteresis characteristics, with FIGS. 5A and 5B showing rectifier current and drain current, respectively, on a common time scale, FIG. 5C showing the hysteresis characteristic of the saturable reactor core, with FIGS. 5A, 5B, and 5C all for light load conditions and with FIGS. 5D and 5E showing rectifier current and drain current, respectively, on a common time scale and FIG. 5F showing the hysteresis characteristic of the saturable reactor core for a heavy load condition.

Using this invention, the circulating current established before the switching interval can be regulated to the minimum necessary for zero-voltage switching even with changing operating conditions. The output rectifier current and transistor drain current ID are shown together with the B-H loop response in FIGS. 5A, 5B, and 5C for a light load condition and FIGS. 5D, 5E, and 5F, for a heavy load condition. The transistor drain current before switching, indicated by reference numeral 135, is regulated by adjusting the flux (B) excursion of the saturable reactor. Increasing the flux excursion at light load will increase the blocking interval such that all the current will flow in one output rectifier during the freewheeling interval. Under this condition, zero-voltage switching is achieved by increasing the circulating current before the switching interval. When there is additional output current, the blocking interval is only part of the freewheeling period and the circulating current is kept constant.

The control of the blocking interval of the saturable reactors is performed solely to adjust the circulating current at the end of the freewheeling interval and not to control the output voltage or current. Control of the output current and voltage is accomplished by controlling the on-time of the diagonally conducting power devices.

While a pair of diodes are shown for output rectification, a full bridge rectifier can alternatively be used in high voltage applications, for example, with a transformer with or without a center tapped secondary.

The foregoing has described a DC-DC resonant transition converter which achieves zero-voltage switching with reduced conduction losses over large line voltage and load changes.

While the invention has been described in connection with one embodiment thereof, numerous changes in form and detail can be made without departing from the spirit of the invention.

What is claimed:

1. A full bridge, resonant transition, DC-to-DC, switching power converter circuit, adapted to be used with a DC power supply means, said circuit comprising:
   (a) a bridge circuit having a first and second switch connected in series forming a first leg, and a third and fourth switch connected in series forming a second leg, said first and second legs connected in parallel with one another and in parallel with the DC power supply means;
   (b) a power transformer having a primary winding and a secondary winding, one end of said primary winding being connected to the junction of said first and second switch and the other end of said primary winding being connected between the junction of said third and fourth switch;
   (c) means for determining and controlling a conduction interval for each of said switches to produce alternating periods of power transfer and freewheeling;
   (d) a first and second saturable reactor, each saturable reactor having a high impedance state and a saturated state, said saturable reactors connected to said secondary winding;
   (e) rectifier means connected to said saturable reactors for providing a rectified output;
   (f) means for determining the circulating current at the end of the freewheeling period; and
   (g) means for introducing a reset current through said saturable reactors, responsive to said circulating current, for maintaining sufficient circulating current at the end of the freewheeling period to achieve zero voltage switching after the freewheeling period.

2. The circuit of claim 1, wherein said rectifier means comprises a first diode having an anode and a cathode, said anode being connected to said first saturable reactor and second diode having an anode and a cathode, said anode of said second diode being connected to said second saturable reactor, and said cathode of said second diode being connected to said cathode of said first diode.

3. The circuit of claim 1, wherein said means for determining the circulating current comprises a current sensor for measuring the current flowing in the switch to be turned on after the freewheeling interval.

4. The circuit of claim 1, wherein said power transformer comprises a center tapped secondary winding with an equal number of turns on a first and second secondary winding.

5. The circuit of claim 4, wherein said means for determining the circulating current at the end of the freewheeling period comprises current transformers in series with said switches that are turned on at the end of the freewheeling period.

6. The circuit of claim 5, wherein said means for introducing a reset current through said saturable reactors comprises control windings coupled to said saturable reactor, a peak detector connected to the output of said current transformers, an error amplifier connected to said peak detector, and means for generating a reset current proportional to the output of the error amplifier connected to the control windings.

7. The circuit of claim 1, further comprising means for increasing the duration of the high impedance state of said saturable reactors with increasing values of voltage of the DC power supply means.

8. The circuit of claim 6, further comprising means for increasing the duration of the high impedance state of said saturable reactors with increasing values of voltage of the DC power supply means.

9. The circuit of claim 8, wherein said means for increasing said reset current with increasing values of voltage of the DC power supply means comprises means for modifying the peak voltage supplied to said error amplifier when the voltage of the DC power supply means changes.

10. A resonant transition, DC-to-DC, switching power converter circuit, adapted to be used with a DC power supply means, said circuit comprising:
 (a) a bridge circuit having a first and second switch connected in series forming a first leg, and a third and fourth switch connected in series forming a second leg, said first and second legs connected in parallel with one another and in parallel with the DC power supply means;
 (b) a power transformer having a primary winding and a center tapped secondary winding with an equal number of turns on a first and second secondary winding, one end of said primary winding being connected to the junction of said first and second switch and the other end of said primary winding being connected between the junction of said third and fourth switch;
 (c) means for determining and controlling a conduction interval for each of said switches to produce alternating periods of power transfer and freewheeling;
 (d) a first saturable reactor, having a high impedance state and a saturated state, connected in series with said first secondary winding;
 (e) a first diode having an anode and a cathode, said anode being connected to said first saturable reactor;
 (f) a second saturable reactor, having a high impedance state and a saturated state, connected in series with said second secondary winding;
 (g) a second diode having an anode and a cathode, said anode being connected to said second saturable reactor, and said cathode being connected to said cathode of said first diode;
 (h) control windings for resetting said saturable reactors;
 (i) means for measuring the circulating current at the end of the freewheeling period; and
 (j) means for providing a reset current to said control windings for resetting said saturable reactors to maintain sufficient circulating current at the end of the freewheeling period to achieve zero voltage switching after the freewheeling period.

11. The circuit of claim 10, wherein said means for measuring the circulating current at the end of the freewheeling period comprises current transformers in series with said switches that are turned on at the end of the freewheeling period.

12. The circuit of claim 11, wherein said means for providing a reset current comprises a peak detector connected to the output of said current transformers, an error amplifier connected to said peak detector, and means for generating a reset current proportional to the output of the error amplifier connected to the control windings.

13. The circuit of claim 12, further comprising means for increasing the duration of the high impedance state of said saturable reactors with increasing values of voltage of the DC power supply means.

14. The circuit of claim 13, wherein said means for increasing said reset current with increasing values of voltage of the DC power supply means comprises means responsive to the voltage of the DC power supply means for modifying the peak voltage supplied to said error amplifier when the voltage of the DC power supply means changes.

15. The circuit of claim 10, wherein said control windings comprise a first and second control winding both connected at one end to said means for providing a reset current, and said first and second control windings connected at the other end to the junction of the end of said first secondary winding and the second saturable reactor, and the junction of said second secondary winding and said second saturable reactor, respectively.

16. A method of achieving zero-voltage switching with reduced conduction losses in a DC-DC converter which clamps a transformer primary during the freewheeling period, said DC-DC converter having saturable reactors in series with the secondary winding of the transformer and with output rectifiers, the method comprising the steps of:
 monitoring the circulating current flowing in the transformer primary during the freewheeling period before the switching interval; and
 providing a reset current responsive to the monitored circulating current to adjust the blocking interval of said saturable reactors so that during the freewheeling interval circulating current is controlled to the minimum value needed to achieve zero-voltage switching.

17. The method of claim 16, further comprising the step of monitoring the DC supply voltage connected to the DC-DC converter, and wherein the reset current provided is also responsive to the value of the DC supply voltage, said reset current increasing with increasing values of DC supply voltages.

* * * * *